Sept. 30, 1952      G. W. BARNES, JR      2,612,323
SUPPLY ROLL TENSION IN A MEASURING INSTRUMENT
Original Filed April 12, 1944      3 Sheets-Sheet 1
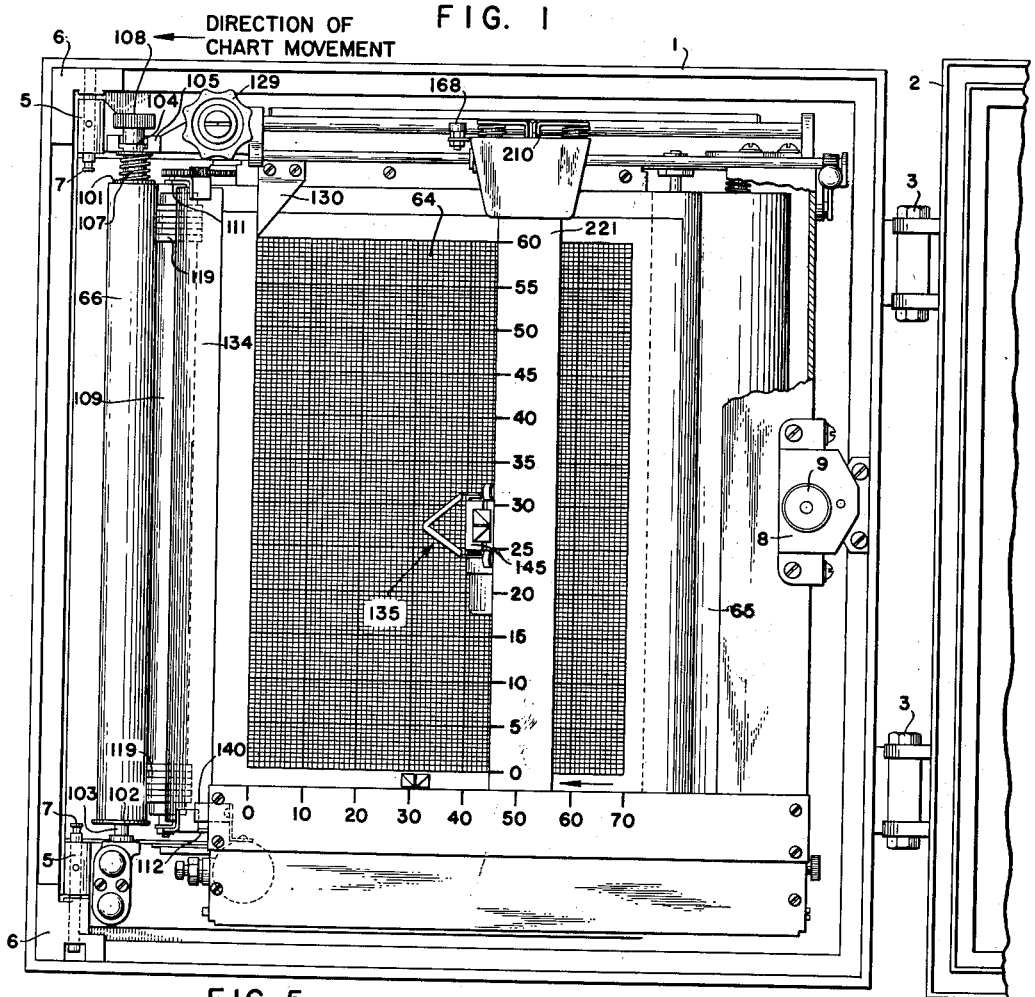
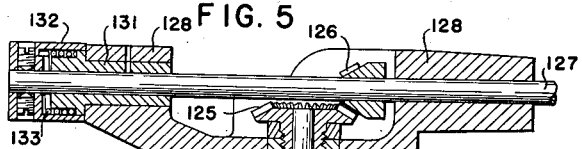
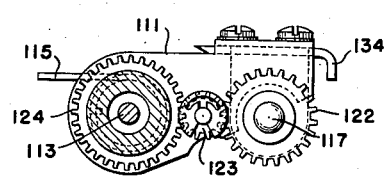
INVENTOR.
GEORGE W. BARNES, JR.
BY
Arthur H. Swanson
ATTORNEY.

Sept. 30, 1952 G. W. BARNES, JR 2,612,323
SUPPLY ROLL TENSION IN A MEASURING INSTRUMENT
Original Filed April 12, 1944 3 Sheets-Sheet 2

INVENTOR.
GEORGE W. BARNES, JR.
BY
Arthur H. Swanson
ATTORNEY.

Sept. 30, 1952        G. W. BARNES, JR        2,612,323
SUPPLY ROLL TENSION IN A MEASURING INSTRUMENT
Original Filed April 12, 1944        3 Sheets-Sheet 3
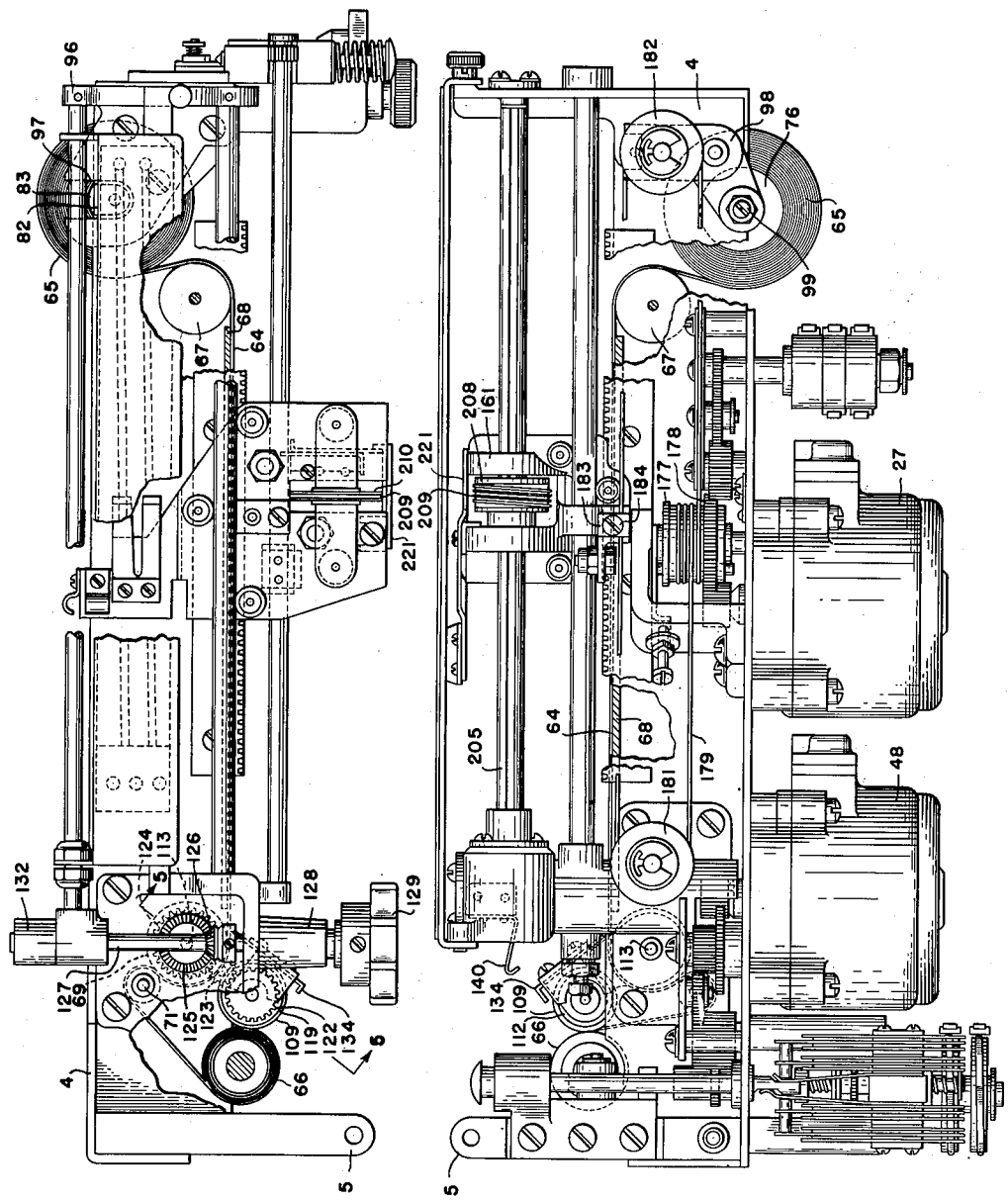
INVENTOR.
GEORGE W. BARNES, JR.
BY
Arthur H. Swanson
ATTORNEY.

Patented Sept. 30, 1952

2,612,323

UNITED STATES PATENT OFFICE 2,612,323

SUPPLY ROLL TENSION IN A MEASURING INSTRUMENT

George W. Barnes, Jr., Clifton Heights, Pa., assignor to Minneapolis-Honeywell Regulator Company, Minneapolis, Minn., a corporation of Delaware Original application April 12, 1944, Serial No. 530,611, now Patent No. 2,527,207, dated October 24, 1950. Divided and this application January 27, 1949, Serial No. 73,162

2 Claims. (Cl. 242—75)

This application is a division of Patent 2,527,207, dated October 24, 1950, which issued from a copending application.

The present invention is directed to a recording instrument including the combination of: a supply roll on which a supply of chart paper is carried, a take-up roll for the chart paper on which a record has been made, and means for tensioning the supply roll.

In most recording instruments the value of a single condition is recorded against time by moving a marking element in one direction and moving the chart upon which the record is made at right angles thereto and at a constant speed. There are times, however, where it is more desirable to record the value of one condition with respect to the value of a second. In such a case a more complicated instrument is necessary since means must be provided for moving the marking element in two directions.

The instrument of the present invention is provided with a pair of motors each one of which, through suitable mechanism, serves to move the recording element across the chart in one direction. Each of these motors is controlled in its rotation by means of an amplifier that is responsive to the variations in a minute electric voltage. This voltage is directly responsive to variations in the condition being measured, such for example, as the voltage produced by a thermocouple if temperature is being measured, or from a tachometer generator if speed is being measured. The chart upon which the record is made is drawn with rectilinear coordinates and is manually moved to bring a new surface under the recording element each time a record is to be made.

Since the chart is held stationary while the record or records are made on it some means must be provided to hold it flat and taut. Means must also be provided to advance the chart to bring a new portion thereof into recording position. The used chart may either be wound into a roll to be examined later or may be torn off in sections. It is, accordingly, a specific object of the invention to provide an improved means to advance a chart to bring unused portions thereof into recording position. It is a further specific object of the invention to provide a means to maintain the chart flat and taut while a record is being made upon it.

It will be obvious to those skilled in the art that any two variables may be plotted against each other such as temperature against pressure, speed against distance, specific gravity against flow, or other variables.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Figure 1 shows a front view of the instrument with the casing door open,

Figure 3 is a top view of the chassis,

Figure 4 is a bottom view of the chassis,

Figure 5 is a view of the paper feeding rolls taken on line 5—5 of Figure 3,

Figure 6 is a view taken on line 6—6 of Figure 5, and

Figure 2:
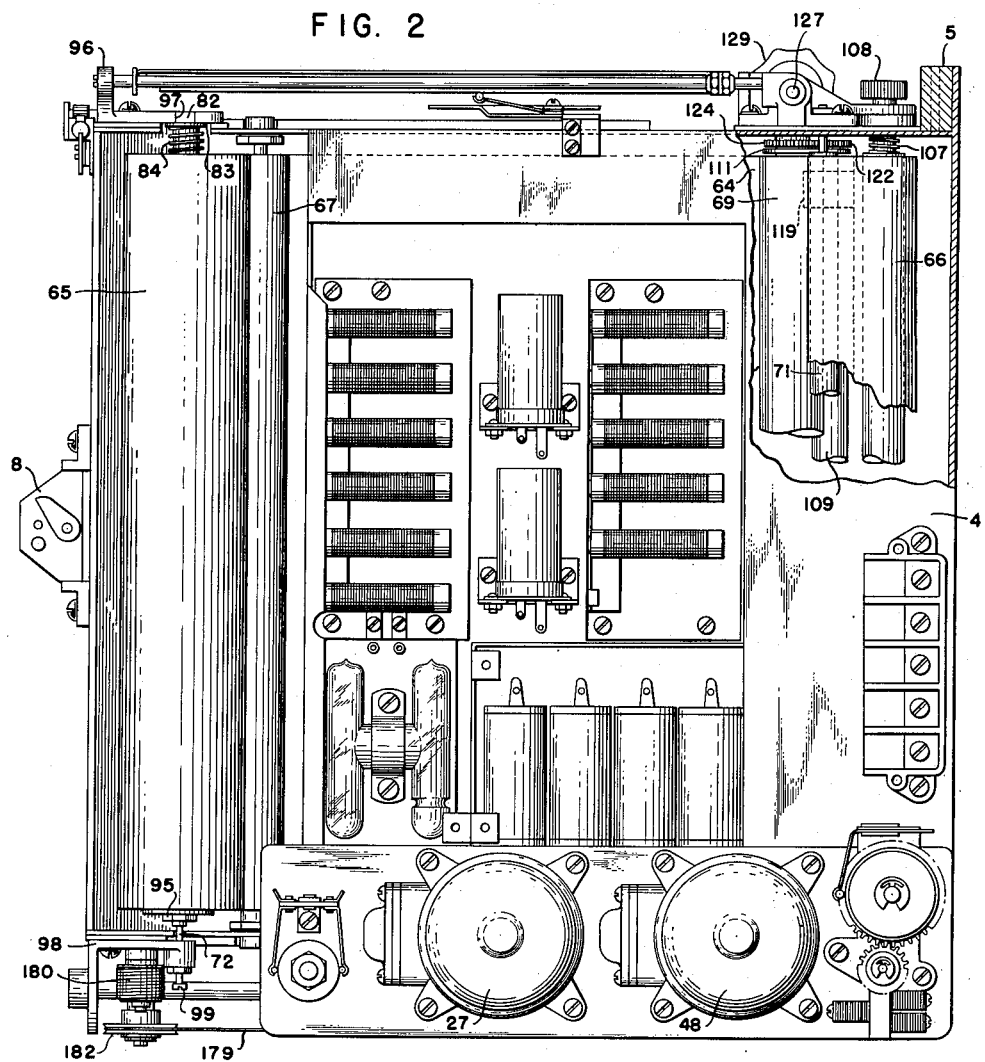
Figure 2 is a back view of the mechanism supported on the chassis.

Referring first to Figure 1, there is shown an instrument casing 1 which is rectangular in shape and which has a door 2 mounted thereon by hinges 3. The door is shown in its open position so that the parts within the casing may be seen. The chart supporting mechanism and the recording mechanism are both mounted on a chassis 4 that is swingably mounted in the instrument casing. To this end the chassis is provided with hinge members 5 that cooperate with hinge members 6 on the casing. Hinge pins 7 extend through the members 5 and 6, so that the chassis is pivotally mounted. The chassis is held in position in the casing 2 by means of a lock 8 that is actuated by a knob 9. The lock may be released and the chassis swung out of the case to give access to various parts of the instrument that are located on the back of the chassis, as shown in Figure 2, or to parts that may be attached to the inside of the casing. Without going into detail, it is sufficient to say that there are located on the chassis and in the casing two self-balancing electrical networks one of which is capable of driving a pen in a vertical direction and the other of which is capable of driving the pen in a horizontal direction across a chart in response to variations in two variable conditions. The details of the construction by means of which this may be accomplished are fully set forth in the above identified parent application, and form no part of the invention claimed herein. It can be said however, that there is provided a motor 27 which when energized serves to move the pen horizontally. There is also provided a motor 48 which when energized serves to move the pen vertically.

As the electrical networks rebalance themselves and cause motors 27 and 48 to rotate, the pen will be moved across a chart 64 that is shown as being in strip chart form and upon which are printed a plurality of individual charts made up of rectilinear coordinates. The chart supply roll 65, as best shown in Figure 3, is mounted on one side of the chassis 4 while the take-up roll 66 is shown on the other side of the chassis. On its way from the supply roll to the take-up roll the chart passes a guide roll 67 which guides it across the front of a platen 68 to a guide roll 69 and a second guide roll 71. Thus the chart is moved from one side of the chassis to the other across the front of a writing platen which serves to back up the chart while a record is being made upon it.

Figure 7:
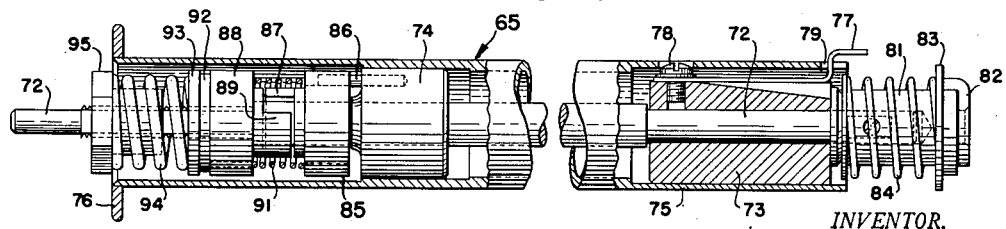
Figure 7 is a sectional view of the chart supporting roll.

The supply roll 65 is mounted upon a core which is so designed that a slight tendency to rewind the chart upon this roll is at all times present, which tendency can be overcome by the slipping of a friction clutch when the chart is moved. Thus the chart is at all times held under tension so that the portion thereof in front of the platen will always be taut. As shown in Figure 7, the supply roll support consists of a shaft 72 upon the upper end of which is rotatably mounted an elongated collar 73 and upon the lower portion of which is mounted a second collar 74. These collars serve to support a drum 75 that has rigidly fastened to its lower end a flange 76. The chart supply roll is mounted on the drum 75 and is kept from rotating with respect thereto by means of a spring 77 whose upper end is adapted to be received in the usual notch formed in the core of the chart roll. This spring is attached to the collar 73 by means of a screw 78 and its upper end extends through a notch 79 formed in the surface of drum 75. The upper end of the shaft 72 has non-rotatably mounted on it a collar 81 that is provided with an enlarged upper portion on the top surface of which is fastened a member 82 having flat sides. Slidably mounted on the collar 81 is a disc 83 which is pressed upwardly into engagement with the lower surface of the enlarged upper portion of the collar by means of a spring 84. Shaft 72 also has rotatable upon it one member 85 of a jaw clutch that is attached by a pin 86 to the collar 74. The member 85 has a jaw 87 projecting downwardly from it which is adapted to engage a jaw 89 projecting upwardly from a second clutch member 88 that is also freely rotatable upon the shaft 72. These clutch members are normally maintained in the relation shown, in which the jaws 87 and 89 do not engage each other, by means of a torsion spring 91 that has one end projecting into the clutch member 85 and the other end projecting into the clutch member 88. Engaging the lower surface of the member 88 is a disc 92 of friction material that is pressed upwardly into engagement with the member 88 by means of a disc 93 that is slidably received on the lower end of the shaft 72. The shaft at this point is provided with flats on its surface with which the disc 93 cooperates so that it will not rotate relative thereto. Clutch member 88, disc 92, and disc 93 are forced into engagement with each other by means of spring 94, whose tension can be adjusted by a nut 95 that is threaded upon the shaft 72.

After the supply roll 65 has been placed on drum 75 with spring 77 in a notch in the roll core, the assembly is placed in position in the chassis (Figs. 2 and 3) with part 82 received in a slot 97 formed in a bracket 96 attached to the top of the chassis. The lower end of shaft 72 is received by an opening in a bracket 98 attached to the lower end of the chassis. The chart roll is maintained in the proper vertical position by a screw 99 that is threaded into the bottom of bracket 98 to limit the downward movement of shaft 72. Washer 83 bearing against the lower surface of bracket 96 under the force of spring 84 assists gravity in holding the assembly in position.

In operation, as the chart is moved across the surface of the platen the chart roll will cause the drum 75 to rotate with it. As the drum rotates it will first move clutch member 85 until the jaw 87 thereof engages the jaw 89 of clutch member 88. Thereafter, the clutch member 88 will also be moved against the friction provided by the engagement between its lower face and the friction disc 92. When the chart has stopped being moved, spring 91 will tend to unwind itself to separate jaws 87 and 89 and thereby place the chart under tension. From the above it will be seen that when the chart is initially moved, the spring 91 is placed under tension and thereafter the chart drum 75 will be rotated against the friction of the disc 92. When the chart is no longer moved, clutch member 88 will remain in its new position and the spring 91 will place the chart under tension.

The take-up roll 66 (Fig. 1) is placed on a drum 101 and is held in position thereon by a flange 102 on the lower end of the drum against which the roll rests. Drum 101 is fastened to a shaft 103 passing through it, which shaft has a collar 104 rotatably mounted on its upper end. In mounting the assembly in the instrument the collar is placed in a suitable holder 105 attached to the chassis with the lower end of shaft 103 in a suitable bearing in the frame. Collar 104 is held in the frame 105 by means of a collar 106 that bears against the bottom of the frame under the force of a spring 107. If desired the take-up roll can be rotated manually by means of a knob 108, but the take-up roll is ordinarily driven by frictional engagement between its surface and the surface of a friction driving roller 109.

The friction drive roll 109 (Figs. 3 to 6) is rotatably supported in an upper arm 111 and a lower arm 112, which arms are pivotally mounted on a vertically extending shaft 113. In order that the arms may have a good bearing on shaft 113, each of them has a sleeve attached to it through which the shaft extends. One of these sleeves is shown at 114 in Figure 5 as being attached to arm 111. It is noted that guide roller 69 is also mounted to rotate around shaft 113 and is therefore provided with bearings that surround the shaft, one of which is shown in Figure 5 below sleeve 114.

Normally the friction roll 109 is spring pressed into engagement with the surface of the take-up roll 66 so that upon rotation of the friction roll 109 the take-up roll will be rotated also. To this end a spring 115 is wrapped around the sleeve 114 and has one end attached thereto, while the other end bears on a portion of the chassis 4. This spring serves to force the arm 112 in a clockwise direction in Figure 4. Arm 111 (not shown in Figure 4) moves with arm 112.

A special construction is used on the upper and lower ends of roll 109 to make sure that there will be sufficient friction between that roll and the take-up roll 66 to drive the latter. Since the upper and lower ends of the friction driving roll are made in exactly the same manner, only the upper end thereof is shown in section in Figure 5. It will be seen that this driving roll is mounted upon sleeves 116 that are in turn attached to a shaft 117 by means of a set screw 118. The shaft 117 is suitably journaled for rotation in arms 111 and 112. The upper end of the sleeve 116 is reduced in diameter as shown, and has placed upon it a number of friction discs 119 that may be made of some material such as composition cork or fibre. These discs are tightly held in engagement with the sleeve 116 by means of a nut 121 that is threaded upon the upper end of the sleeve. The discs 119 are slightly larger in diameter than the roller 109 so that as the roller is rotated, these discs will bear upon the surface of the take-up roll to drive the same. Due to their friction characteristics, there will be no slippage between the take-up roll and the friction driving roll.

Rotation is imparted to the driving roll 109 by means of a gear 122 fastened to the upper end of the shaft 117. This gear meshes with a pinion 123 mounted on the arm 111, which pinion in turn is driven by a gear 124. As shown in Figure 5, this gear has a tubular extension that is journaled in the chassis 4 and which is attached to a bevel pinion 125. The upper end of shaft 113 is received by the bevel pinion which acts as a bearing therefor. The pinion 125 meshes with a second beveled pinion 126 that is attached to a shaft 127 which is journaled in bearings 128. In the operation of the device, a knob 129 on the front end of shaft 127 is rotated to rotate the pinion 126, and the various gears forming the gear train between that pinion and gear 122, so that the drum 109 can be rotated to drive the take-up roll.

Normally the knob 129 is rotated in a direction so that the chart will be wound up on the roll 66. In order to prevent retrograde movement of the roll 109, the shaft 127 has mounted on it what is, in effect, a one-way brake. To this end the rear bearing 128 for the shaft 127 has in it a hardened steel bushing 131 that receives the shaft. Mounted on the outer end of the shaft in a cup shaped member 132 of such a diameter that an annular space is left between this member and bushing 131. Within this space is a coil spring 133 that loosely encircles the bushing and which has one end attached to the cup shaped member. This spring is wound in such a direction that upon rotation of the shaft 127 in a direction to feed the chart to roller 66, the spring will tend to expand into engagement with the inner surface of the cup member. Upon rotation of the shaft 127 in a reverse direction, however, the spring 133 will grab the outer surface of the bushing 131 to prevent or retard rotation of the shaft 127 in that direction. From the above it will be seen that since the friction roller 109 cannot turn in a reverse direction, the spring 91 in the supply roll can pull the chart tight without having a tendency to unwind it from the take-up roll.

At times it may be desirable to tear off each of the sections of the chart after it has had a record drawn upon it, rather than saving all of these sections in a roll. If this is the case, the chart will be directed from the guide roll 71, as seen in Figure 3, between the drum 101 upon which the take-up roll 66 is normally mounted and the friction driving roller 109, around in front of that driving roll and behind a cutter member 134. When this type of chart drive is used, the chart is pinched between rolls 101 and 109 to be fed forwardly below the cutting edge. When the chart has been advanced sufficiently, it may be pulled downwardly against the cutting edge to be torn off in sections. An indicator 130 on the chassis (Fig. 1) cooperates with the chart to show when it is properly positioned.

In order to simplify the attaching of the chart to take-up roll and the threading of the chart around guide rollers 69 and 71, a means is provided to hold the friction drive roll 109 out of engagement with the take-up roll 66. For this purpose a hook 140 (Figs. 1 and 4) is fastened to the lower portion of the chassis. When a new chart is to be placed in the instrument the friction drive roll 109 is moved clockwise in Figure 4 against the force of spring 115 until the hook 140 is engaged behind the bent edge of the cutter bar 134. The friction drive roll will then be held in inactive position until it is released by removing the hook from the cutter bar.

The pen 135 which is used to make a record on the chart is mounted on a vertically movable carriage 145 that is in turn mounted on a horizontally movable frame 221. Because of this type of mounting, the pen can be moved in any direction across the chart to record the varying values of the two conditions that are being measured.

The frame 221 carrying the pen carriage and pen is moved horizontally across the front of instrument by means of the motor 27 in response to unbalance of one of the above mentioned electrical networks. To this end, the motor 27 is attached to the lower part of the chassis 4 on the back thereof, as shown in Figures 2 and 4. As the motor rotates, it drives a pulley 177 through suitable gearing, including a gear 178 that is formed on the pulley. Rotation of the pulley is transferred to the frame by means of a cable 179 which has its ends wrapped around and attached to the pulley 177. The central part of the cable extends from the lower surface of the pulley around guide pulleys 181 and 182, the latter of which is biased in a clockwise direction in Figure 4 by a spring 180 (Fig. 2) in order to keep the cable under tension. Movement of the cable as the pulley 177 rotates is imparted to the frame due to the fact that the cable is attached to a casting 161 of the frame 221 by means of a block 183 which grips the cable between itself and the casting. A screw 184 is provided for this purpose.

The pen carriage is moved vertically on frame 221 by the motor 48 in response to unbalance of the other electrical network. For this purpose, the motor is mounted on the lower portion of the chassis 4 and over to one side beyond the travel of the frame. The motor drives a splined shaft 205 extending transversely across the lower portion of the chassis of the instrument and journaled for rotation therein. As the splined shaft 205 rotates, it rotates a pulley 208, as shown in Figure 4 which pulley is slidably received on the shaft 205 and is moved along the shaft as the frame moves by portions of the casting 161 which engage its sides. The pen carriage is raised and lowered by a cable 209 which has its ends fastened to pulley 208. The center portion of the cable passes over a pulley 210 as shown in Figures 1 and 3, which pulley is mounted in the upper portion of the movable frame 221.

From the above it will be seen that there is provided a mechanism to move a pen in two directions across a chart. There is also provided a mechanism to support a supply roll of chart and move the chart across a platen and hold it taut in recording position. The chart may be either re-rolled or torn off in sections, as desired.

While in accordance with the provisions of the statutes, I have illustrated and described the best form of this invention now known to me, it would be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described this invention, what I claim as new and desire to secure by Letters Patent is:

1. In a recording instrument having a chart upon which a record is to be drawn, means to hold a supply roll of the chart comprising a shaft fixed against rotation, a drum upon which a supply roll of chart is to be placed, means to rotatably mount said drum on said shaft, a first part fixed to said drum, a second part on said shaft, means resiliently tending to hold said parts in a position that is disturbed when a portion of chart is unwound from a chart supply roll, and means to frictionally maintain said second part against rotation on said shaft.

2. In a recording instrument having a chart upon which a record is to be made, means to support a supply roll of chart comprising a shaft fixed against rotation in the instrument, a drum rotatably mounted on said shaft, a first part having a projection thereon attached to said drum, a second part having a projection thereon carried by said shaft, said projections cooperating to permit limited movement therebetween, means resiliently holding said parts at one limit of their movement, said parts being moved to the opposite limit of their movement when said drum is rotated as the chart is unrolled, and means to frictionally maintain said second part against rotation on said shaft.

GEORGE W. BARNES, Jr.

REFERENCES CITED

The following references are of record in the file of this patent:

UNITED STATES PATENTS

| Number | Name | Date |
|---|---|---|
| 630,601 | Egry et al. | Aug. 8, 1899 |
| 877,232 | Rolland | Jan. 21, 1908 |
| 1,831,790 | Leong | Nov. 10, 1931 |
| 1,969,877 | Doty | Aug. 14, 1934 |
| 2,139,784 | Wengel | Dec. 13, 1938 |